US010721003B2

(12) United States Patent
Mylsamy et al.

(10) Patent No.: US 10,721,003 B2
(45) Date of Patent: Jul. 21, 2020

(54) MOBILE COMMUNICATION DEVICE, TESTING SYSTEM AND METHOD FOR TESTING A DEVICE UNDER TEST

(71) Applicant: Rohde & Schwarz GmbH & Co. KG, Munich (DE)

(72) Inventors: Raaja Guru Mylsamy, Singapore (SG); Woo Seok Kang, Nusajaya (MY)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 15/940,767

(22) Filed: Mar. 29, 2018

(65) Prior Publication Data

US 2018/0287720 A1 Oct. 4, 2018

(30) Foreign Application Priority Data

Mar. 30, 2017 (EP) .................................... 17163783

(51) Int. Cl.

*H04B 17/00* (2015.01)
*H04B 17/11* (2015.01)
*H04B 17/21* (2015.01)
*H04B 17/19* (2015.01)
*H04W 24/06* (2009.01)

(52) U.S. Cl.

CPC ......... *H04B 17/0085* (2013.01); *H04B 17/19* (2015.01); *H04W 24/06* (2013.01); *H04B 17/11* (2015.01); *H04B 17/21* (2015.01)

(58) Field of Classification Search

CPC ......... H04L 43/50; H04L 12/66; H04L 67/10; H04B 17/0085; H04B 17/00; H04B 1/40; H04W 24/06; H04W 12/08; G06Q 30/0283; H04Q 7/20; H04M 1/00
USPC ........... 370/252–469; 375/221–224; 714/739
See application file for complete search history.

(56) References Cited

U.S. PATENT DOCUMENTS 6,892,337 B1 5/2005 Brophy et al.
7,539,489 B1 5/2009 Alexander
2012/0289236 A1* 11/2012 Xu ........................ H04W 16/14 455/446
2014/0040985 A1* 2/2014 Wang .................... H04W 12/06 726/3
2014/0092823 A1* 4/2014 Song ......................... H04L 1/00 370/329
2016/0050572 A1 2/2016 Merkel et al.
2018/0115480 A1* 4/2018 Hsu ......................... H04L 43/50

OTHER PUBLICATIONS

Extended European Search Report dated Aug. 23, 2017, issued in priority European Application No. 17163783.8, filed Mar. 30, 2017, 8 pages.

* cited by examiner

*Primary Examiner* — Iqbal Zaidi
(74) *Attorney, Agent, or Firm* — Christensen O'Connor Johnson Kindness PLLC

(57) ABSTRACT

A mobile communication device is described that comprises a testing module for testing purposes and a communication module for wireless communication. The testing module is configured to simulate a communication partner for a device under test. The testing module is configured to send and/or receive test signals. The testing module is configured to test at least a physical layer. Further, a testing system and a method for testing a device under test are described.

16 Claims, 1 Drawing Sheet

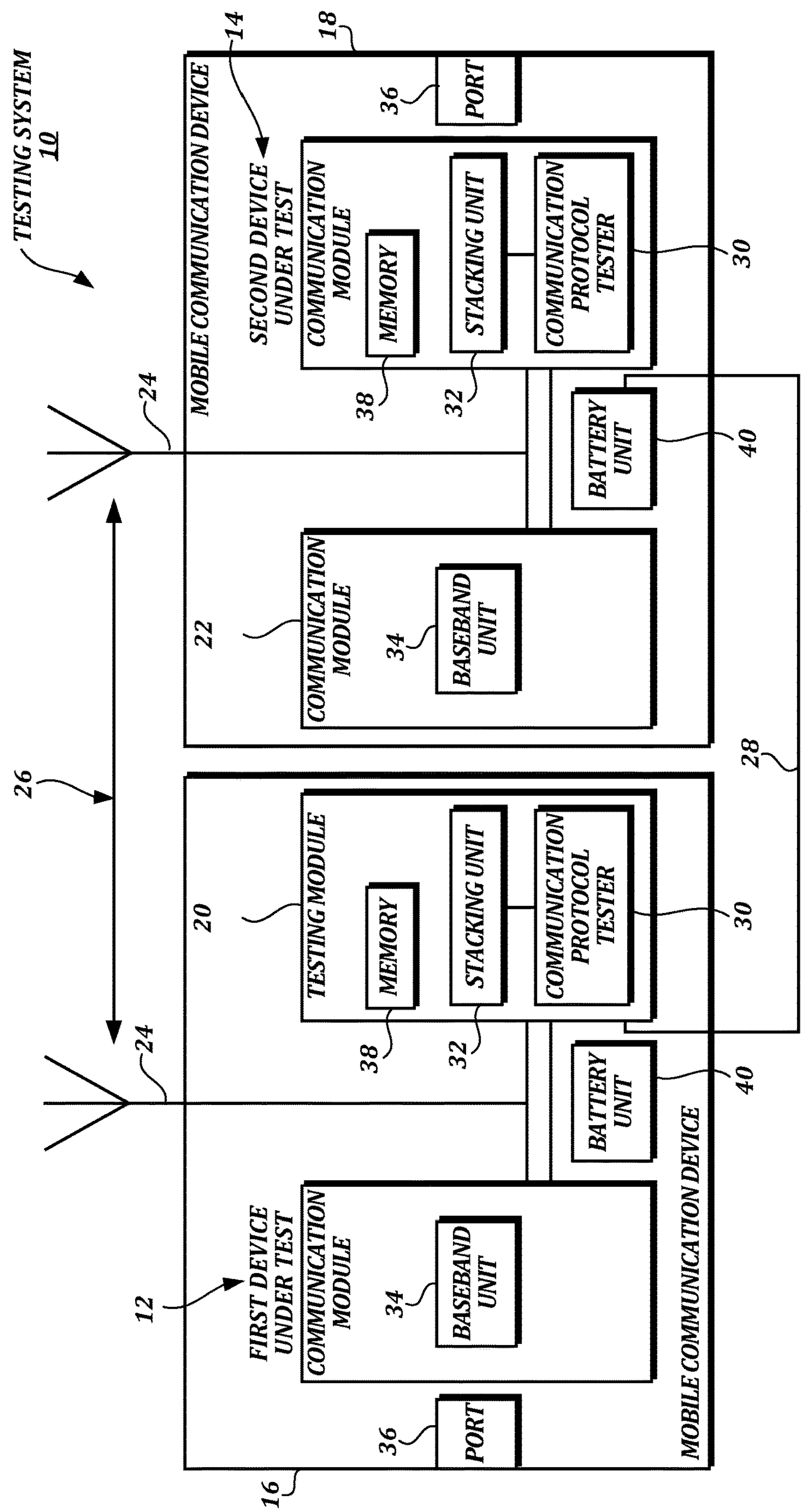
TESTING SYSTEM
10
MOBILE COMMUNICATION DEVICE
SECOND DEVICE UNDER TEST
14
18
36
PORT
COMMUNICATION MODULE
MEMORY
STACKING UNIT
COMMUNICATION PROTOCOL TESTER
30
38
32
24
BATTERY UNIT
40
COMMUNICATION MODULE
22
34
BASEBAND UNIT
26
28
TESTING MODULE
20
MEMORY
STACKING UNIT
COMMUNICATION PROTOCOL TESTER
30
38
32
24
BATTERY UNIT
40
FIRST DEVICE UNDER TEST
12
COMMUNICATION MODULE
34
BASEBAND UNIT
36
PORT
MOBILE COMMUNICATION DEVICE
16

MOBILE COMMUNICATION DEVICE, TESTING SYSTEM AND METHOD FOR TESTING A DEVICE UNDER TEST

FIELD OF THE DISCLOSURE

Embodiments of the present disclosure relate generally a mobile communication device, a testing system and a method for testing a device under test.

BACKGROUND

In the state of the art, mobile communication devices used for wireless communication are typically tested by a separately formed test and measurement device that comprises inter alia a communication protocol tester.

The device under test may transmit a test signal for testing purposes wherein the test signal is received by the test and measurement device for analyzing purposes. However, such a testing system is complex as the testing method related thereto takes a long time, in particular while testing many different mobile communication devices.

SUMMARY

In view of the above, there is a need for testing a device under test, for example a mobile communication device, in an easy and cost efficient manner.

Embodiments of the present disclosure provide a mobile communication device comprising a testing module for testing purposes and a communication module for wireless communication, wherein the testing module is configured to simulate a communication partner for a device under test, wherein the testing module is configured to send and/or receive test signals and wherein the testing module is configured to test at least a physical layer.

Embodiments of the present disclosure also provide a testing system that comprises a device under test and a mobile communication device as mentioned above.

Further, embodiments of the present disclosure provide a method for testing a device under test by using a mobile communication device having a testing module for testing purposes and a communication module for wireless communication, for example a mobile communication device as mentioned above, wherein a communication partner for the device under test is simulated and at least a physical layer is tested.

Accordingly, a cost-efficient testing environment for multiple devices under test can be provided since the device under test itself has a testing module being used for testing at least the physical layer. Accordingly, the mobile communication device may be used for testing other devices under test, for instance other mobile communication devices, while the testing module is simulating a communication partner for the devices under test. Accordingly, no separately formed test and measurement device has to be purchased. The communication partner simulated by the testing module may be a base station or another mobile communication device, for example a communication module of the mobile communication device. The testing module and the communication module are integrated in the mobile communication device such that they are commonly housed. Further, the communication module for wireless communication may comprise a baseband unit that is configured to process physical data (PHY data) corresponding to the physical layer that is forwarded to or received from the device under test. The received physical layer is converted in the baseband unit wherein the physical data obtained are forwarded to the testing module for analyzing purposes such that at least the physical layer is tested. The testing module may comprise a stacking unit being configured to process at least the physical layer, for example a Long Term Evolution stack (LTE stack). The physical layer is also named layer 1 according to the Open Systems Interconnection model (OSI model). In the 5G architecture, the physical layer is embedded in the open wireless architecture (OWA) besides a data link layer. Thus, the open wireless architecture may also be tested.

Furthermore, the mobile communication device is configured to test itself. The testing module simulates a communication partner for the mobile communication device being the device under test.

According to an aspect, the testing module comprises a communication protocol tester. The communication protocol tester is inter alia fed with the data of the signal, for example the data relating to the physical layer. Further, the testing module having the stacking unit provides inter alia the medium access control layer while simulating a communication partner such that the communication protocol tester can verify the characteristics of the communication module of the device under test.

Accordingly, the testing module may be further configured to test a medium access control layer, for example wherein the medium access control layer is tested within the testing module internally. Therefore, the stacking unit provides the data representing the medium access control layer to the communication protocol tester for testing purposes.

Moreover, the testing module may be configured to test a signaling layer 2 and a signaling layer 3, for example wherein the physical layer and the signaling layer(s) are defined the LTE architecture. The signaling layers 2 and 3 are provided by the stacking unit of the testing module wherein these layers are forwarded to the communication protocol tester for testing purposes. The signaling layer 2 comprises the medium access control layer (MAC layer), a radio link control layer (RLC layer) and a packet data convergence control layer (PDCP layer) whereas the signaling layer 3 comprises a radio resource control layer (RRC layer), a non-access stratum layer (NAS layer) and a internet protocol layer (IP layer).

The physical layer and the signaling layer(s) or their data may be merged within the testing module, for example its stacking unit, at least partly for simulating the communication partner.

According to another aspect, the testing module is configured to test the same communication standard that is used by the communication module. This ensures that the properties and characteristics of the device under test, for example the receiving and transmission characteristics, can be verified under real conditions since the communication partner simulated by the testing module is simulated such that it uses the same communication standard.

Further, the mobile communication device may be configured to perform tests over the air, for example for receiving and/or transmitting the physical layer over the air. The mobile communication device, for example its testing module, is configured to communicate with other communication devices over the air wherein the data, for example the physical data, provided by the testing module is forwarded to the communication module for transmitting the physical layer. Alternatively, the physical layer is received by the mobile communication device wherein the physical layer is converted in the communication device which forwards the physical data obtained to the testing module for testing purposes. Accordingly, the test signals used for testing purposes are transmitted or received by the mobile communication device wherein these test signals comprise the physical layer, for example the physical data corresponding to the physical layer. Moreover, the mobile communication device itself is configured to transmit the physical layer over the air such that the device under test having a communication module can be tested appropriately. The device under test may be another mobile communication device or the mobile communication device that transmits the test signals (self-testing mode). Hence, the mobile communication device may be used for testing itself.

According to another aspect, the device is powered by a battery or an accumulator. The mobile communication device is powered during the testing by the battery or the accumulator. This ensures that the mobile communication device is tested under real conditions. Moreover, the mobile communication device is a transportable device that does not require a plug.

In addition, the device has an integrated antenna. The integrated antenna can be used by the communication module for receiving and/or transmitting at least the physical layer over the air. The testing module is also connected to the integrated antenna via the communication module.

Furthermore, the mobile communication device may have a port for an external antenna to be connected to the device. Thus, signals can be transmitted or received via a separately formed antenna with regard to the integrated antenna. This ensures that two different antennas can be used for testing purposes, for example while using a self-testing mode of the mobile communication device. Hence, the communication module may transmit a physical layer via the integrated antenna that is received by the testing module via the external antenna connected to the port.

Alternatively, the integrated antenna is used for the self-testing mode wherein the signals are transmitted and received in an alternating manner.

According to another aspect, the device is a self-testing device. Thus, the mobile communication device is configured to test itself. The mobile communication device comprises a self-testing mode. In this self-testing mode, physical data is provided by the testing module wherein this data is converted by the communication module such that the physical layer can be transmitted over the air. Then, the physical layer transmitted is received by the same mobile communication device wherein the corresponding data is extracted in the communication module by converting the physical layer received. The physical data obtained is forwarded to the testing module that simulates the communication partner. The data provided is processed in the communication protocol tester appropriately. The testing module may simulate another (mobile) communication device or a base station.

According to an embodiment, the testing module has a memory comprising data representing at least one test scenario. Thus, the testing module is configured to perform different tests in a predefined order. In some embodiments, different data are transmitted/received during the test scenario. The test scenario may comprise testing the mobile communication device itself and/or other mobile communication devices. Hence, the mobile communication device transmitting the test signals can test itself, for example its communication module interacting with the testing module of the mobile communication device. Furthermore, the test scenario may comprise different communication partners simulated subsequently.

Another aspect provides that the testing module is configured to measure the radio frequency quality of the device under test. Accordingly, the communication properties of the device under test can be verified. Testing the radio frequency quality may be implemented in a certain test scenario being stored in the memory of the testing module as a specific test.

In addition, the testing module may be configured to forward test results obtained to an external device. This ensures that a user or operator of the testing system, for example the mobile communication device, is able to analyze the data obtained during the testing. The external device may be established by a computer or another computational device. The connection of the external device can be established by a line, for instance a universal serial bus cable (USB cable).

Another aspect provides that the communication module is the device under test such that the testing system is established by the mobile communication device itself. Accordingly, the mobile communication device is a self-testing device wherein the communication module of mobile communication device is the device under test being tested by the testing module of the same mobile communication device.

Further, the testing module may be connected to the device under test via a cable. The cable may be established by a universal serial bus cable (USB cable). Hence, information regarding the device under test can be obtained easily. This information can be used while simulating the communication partner. The device under test may be established by another (mobile) communication device, for example its communication module.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

The FIGURE schematically shows a testing system according an embodiment of the present disclosure that comprises two mobile communication devices according an embodiment of the present disclosure.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In the FIGURE, a testing system 10 is schematically shown that is used for testing a device under test. In the shown embodiment, the testing system 10 comprises a first device under test 12 and a second device under test 14 wherein both devices under test 12, 14 are established by a mobile communication device 16, 18.

According to the shown test setup, the first mobile communication device 16 is used for testing the second mobile communication device 18 representing the device under test 14. However, the second mobile communication device 18 can also be used for testing the first mobile communication device 16.

Each of the mobile communication devices 16, 18 comprises a testing module 20 and a communication module 22 for wireless communication. The testing module 20 and the communication module 22 are connected with each other such that data can be transmitted between both modules 20, 22. In general, the testing module 20 is configured to simulate a communication partner of the device under test 12, 14, for example a base station or another (mobile) communication device. Further, the mobile communication devices 16, 18 each comprise an integrated antenna 24 that is used for receiving and/or transmitting signals as will be described later.

Since the mobile communication devices 16, 18 are configured for wireless communication, a communication line over the air (OTA) 26 is established between the mobile communication devices 16, 18 while communication with each other.

In addition, both mobile communication devices 16, 18 are connected with each other via a cable 28 wherein the cable 28 is established by a universal serial bus cable (USB cable). In some embodiments, the testing module 20 of the first communication device 16 is connected with the communication module 22 of the second mobile communication device via the cable 28. The cable 28 ensures that information can be gathered easily that is used for testing purposes, for example simulating purposes.

As shown in the FIGURE, the testing modules 20 each have a communication protocol tester 30 that is configured to test a communication standard being the same one as used by the communication module 22 of the mobile communication devices 16, 18.

In addition, each testing module 20 has a stacking unit 32 that is connected to the communication protocol tester 30 wherein the stacking unit 32 processes/simulates the different layers used. Accordingly, the stacking unit 32 is configured to simulate the communication partner of the device under test 12, 14 while simulating at least certain layers as will be described later.

The communication modules 22 communicating with the testing modules 20 each have a baseband unit 34. Each baseband unit 34 is configured to receive physical data (PHY data) from the corresponding testing module 20 and to convert the physical data into a physical layer that is transmitted over the air via the communication line 26 by using the integrated antenna 24. Vice versa, the same baseband unit 34 is also configured to receive a physical layer via the integrated antenna 24 from a base station or another communication device, for instance the second mobile communication device 18, wherein the physical layer received is transmitted over the communication line 26. The physical layer received is converted into physical data (PHY data) by using the baseband unit 34 wherein the physical data is forwarded to the testing module 20 for testing and analyzing purposes. The testing module 20 simulates the communication partner, for example by simulating the other layers, namely signaling layers 2 and 3 according to the OSI model. While testing the 5G standard, other layers may be simulated that correspond to the signaling layers 2 and 3 according to the OSI model.

As shown in the FIGURE, the testing module 20 is connected to the integrated antenna 24. However, the mobile communication device 16, 18 has an additional port 36 for an external antenna (not shown) that can be connected to the mobile communication device 16, 18. Thus, it is possible to perform tests while using different antennas, for example using the external antenna to be connected to the port 36 additionally.

Therefore, the mobile communication device 16, 18 can be used in a self-testing mode since one antenna is used for transmitting the physical layer wherein the other antenna is used for receiving the physical layer transmitted previously. By using the external antenna, one mobile communication device 16, 18 is configured to test itself as the communication module 22 represents the device under test 12, 14 interacting with the corresponding testing module 20 being housed in the same device 16, 18. Accordingly, the communication module 22 transmits the physical layer via the integrated antenna 24 that is received by the testing module 20 via the external antenna to be connected to the port 36. The testing module 20 simulates a communication partner of the single mobile communication device 16, 18 for testing purposes.

Moreover, the testing modules 22 each have a memory 38 comprising data representing at least one test scenario that can be performed by the mobile communication device 16, 18 for testing purposes, for example the corresponding testing module 22. For instance, the testing module 22 is configured to measure the radio frequency quality of the device under test 12, 14.

Further, the mobile communication devices 16, 18 each have a battery unit 40 for powering the mobile communication device 16, 18 wherein the battery unit 40 can be established by an accumulator or a battery.

In general, the testing module 20 may be configured to forward test results obtained to an external device, for instance a computer that is connected to the mobile communication device 16, 18. Thus, the mobile communication device 16, 18 each has an output to be connected to the external device, for instance the output used for the cable connection, namely a universal serial bus port (USB port).

Each of the mobile communication devices 16, 18 may be a self-testing device such that the communication module 22 of the mobile communication device 16, 18 represents the device under test 12, 14. Accordingly, no other test and measurement device is needed for testing the mobile communication device 16, 18, for example no separately formed one that is only used for testing purposes.

Alternatively, the mobile communication device 16, 18 can be used for testing several other mobile communication devices since the physical layer is transmitted via the integrated antenna 24 to the other communication devices that receive and process the physical layer appropriately.

Furthermore, the testing module 20 may also comprise a baseband unit such that the physical layer received by the antenna 24 is directly forwarded to the testing module 20. In the same manner, the physical data provided by the testing module 20 can be converted in the testing module 20 internally. Accordingly, the testing module 20 may have the port 36 such that the signals received/transmitted via the external antenna are forwarded to/from the testing module 20 directly, for example the baseband unit of the testing module 20.

Hereinafter different testing scenarios are described with regard to the testing system 10 shown in the FIGURE. The first mobile communication device 16 can be used for testing the second mobile communication device 18. Accordingly, the testing module 20 of the first mobile communication device 16 provides physical data to the baseband unit 34 of the communication module 22 that converts this data into the physical layer that is transmitted via the integrated antenna 24 to the second mobile communication device 18 using the communication line 26.

The integrated antenna 24 of the second mobile communication device 18 receives the physical layer transmitted wherein the physical layer is forwarded to the communication module 22 of the second mobile communication device 18 representing the device under test 14 according to the described test scenario. The baseband unit 34 of the second mobile communication device 18 converts the physical layer received into physical data (PHY data) that is forwarded to the testing module 20 of the first mobile communication device 16 via the cable 28, for example the communication protocol tester 30, for testing and analyzing purposes.

Further, the stacking unit 32 of the first mobile communication device 16 provides data regarding the signaling layers 2 and 3 to the communication protocol tester 30 of the first mobile communication device 16 such that a communication partner is simulated. The communication protocol tester 30 analyzes the data received in order to measure the radio frequency quality, for instance.

Another test scenario represents a self-testing mode of the mobile communication device 16, 18, for instance the first mobile communication device 16 shown in the FIGURE. Therefore, the testing module 20 may be connected to an external antenna via the port 36 and the communication module 22, for example the baseband unit 34 converting the physical layer into physical data to be processed by the testing module 20.

The stacking unit 32 of the single mobile communication device 16 provides physical data to the communication module 22, for example the baseband unit 34, wherein the physical data is converted into a physical layer by the baseband unit 34. Then, the physical layer obtained is transmitted via the integrated antenna 24.

The physical layer transmitted is received by the external antenna connected to the port wherein the physical layer received is re-converted into the physical data (PHY data) that is forwarded to the testing module 20 for testing and analyzing purposes, for example to the communication protocol tester 30.

Simultaneously, the stacking unit 32 of the single mobile communication device 16 provides data regarding the signaling layers 2 and 3 wherein these data are also forwarded to the protocol tester 30. Thus, the testing module 20 simulates a communication partner of the single mobile communication device 16 representing the device under test 12, for example the communication module 22.

The testing module 20 may simulate another communication device, for instance a mobile one, or a baseband station that typically communicates with the single mobile communication device 16 being tested.

Accordingly, each mobile communication device 16, 18 has an embedded testing environment provided by the testing module 20. Therefore, the testing system 10 can be established by a single mobile communication device 16, 18 representing the device under test 12, 14 simultaneously. This enables testing many mobile communication devices in short time. Moreover, additional hardware for testing is not required.

The user or operator may use the mobile communication device 16, 18 for testing other devices under test by simply placing the mobile communication device 16, 18 next to the device under test.

It will be appreciated that several components, have been described herein as "processing" signals, "transmitting signals" and the like, or that various signals are being "analysed," "compared," "measured", etc., by such components. These functionalities can be carried out in embodiments of the present disclosure by analog circuitry, digital circuitry, or a combination of analog and digital circuitry, and can include discrete digital or analog circuit elements or electronics, or combinations thereof. Such circuitry is configured and arranged in order to implement the functionalities, technologies and methodologies set forth herein.

Various components described herein may include, in some embodiments, logic for implementing the functionalities, technologies and methodologies described herein. This logic can be carried out in either hardware or software, or a combination of hardware and software. In some embodiments, one or more components may include one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof. In an embodiment, one or more of these components includes a microprocessor and a memory storing logic modules and/or instructions. In an embodiment, one or more of these components includes one or more ASICs having a plurality of predefined logic components. In an embodiment, one or more of these components includes one or more FPGA having a plurality of programmable logic components. In an embodiment, one or more of these components includes hardware circuit implementations (e.g., implementations in analog circuitry, implementations in digital circuitry, and the like, and combinations thereof). In an embodiment, one or more of these components includes combinations of circuits and computer program products having software or firmware instructions stored on one or more computer readable memories that work together to cause a device to perform one or more methodologies or technologies described herein. Of course, in some embodiments, two or more of these components, or parts thereof, can be integrated or share hardware and/or software, circuitry, etc.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A mobile communication device comprising:

a testing circuit for testing purposes and a communication circuit for wireless communication, the testing circuit being configured to simulate a communication partner for a device under test, the testing circuit being configured to at least one of send test signals and receive test signals, the testing circuit being configured to test at least a physical layer, the mobile communication device being configured to perform tests over the air, wherein the device under test is another communication device or wherein the device under test is said mobile communication device, such that the test signal is transmitted and received by the same mobile communication device.

2. The device according to claim 1, wherein the testing circuit comprises a communication protocol tester.

3. The device according to claim 1, wherein the testing circuit is configured to test the same communication standard that is used by the communication circuit.

4. The device according to claim 1, wherein the device is configured to perform tests over the air for at least one of receiving the physical layer over the air and transmitting the physical layer over the air.

5. The device according to claim 1, wherein the device is powered by a battery or an accumulator.

6. The device according to claim 1, wherein the device has an integrated antenna.

7. The device according to claim 1, wherein the device has a port for an external antenna to be connected to the device.

8. The device according to claim 1, wherein the device is a self-testing device.

9. The device according to claim 1, wherein the testing circuit has a memory comprising data representing at least one test scenario.

10. The device according to claim 1, wherein the testing circuit is configured to measure the radio frequency quality of the device under test.

11. The device according to claim 1, wherein the testing circuit is configured to forward test results obtained to an external device.

12. A testing system comprising a device under test and a mobile communication device, the mobile communication device comprising a testing circuit for testing purposes and a communication circuit for wireless communication, the testing circuit being configured to simulate a communication partner for a device under test, the testing circuit being configured to at least one of send test signals and receive test signals, the testing circuit being configured to test at least a physical layer, the mobile communication device being configured to perform tests over the air, wherein the device under test is another communication device or wherein the device under test is said mobile communication device, such that the test signal is transmitted and received by the same mobile communication device.

13. The testing system according to claim 12, wherein the communication circuit is the device under test.

14. The testing system according to claim 12, wherein the testing circuit is connected to the device under test via a cable.

15. A method for testing a device under test by using a mobile communication device having a testing circuit for testing purposes and a communication module for wireless communication, with the following steps:

simulating a communication partner for the device under test; and testing at least a physical layer, wherein the test is performed over the air, wherein the device under test is another communication device or wherein the device under test is said mobile communication device, such that the test signal is transmitted and received by the same mobile communication device.

16. The method according to claim 15, wherein the mobile communication device comprises a testing circuit for testing purposes and a communication circuit for wireless communication, the testing circuit being configured to simulate a communication partner for a device under test, the testing circuit being configured to at least one of send test signals and receive test signals, the testing circuit being configured to test at least a physical layer.

* * * * *